United States Patent Office 3,297,216
Patented Jan. 10, 1967

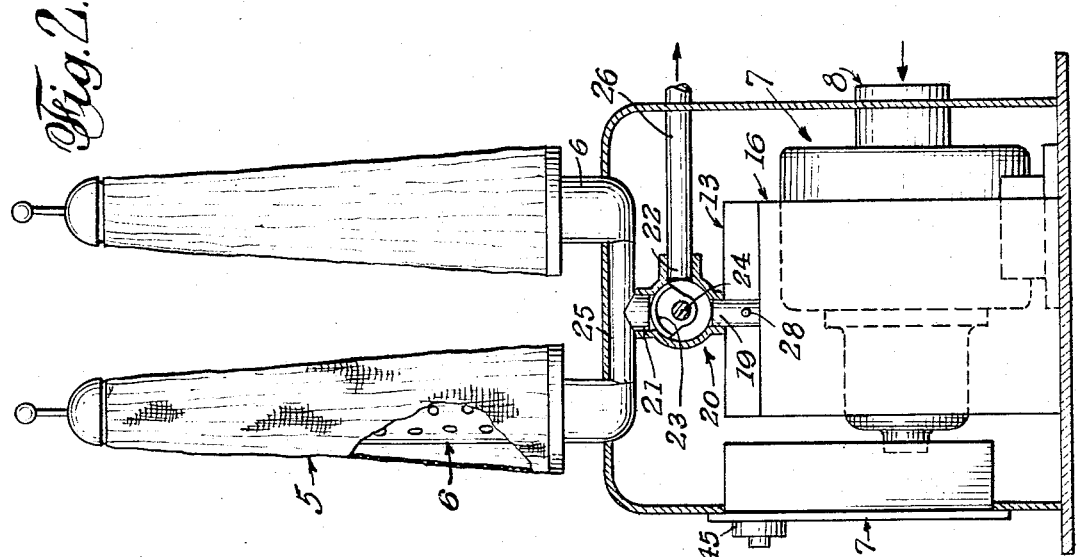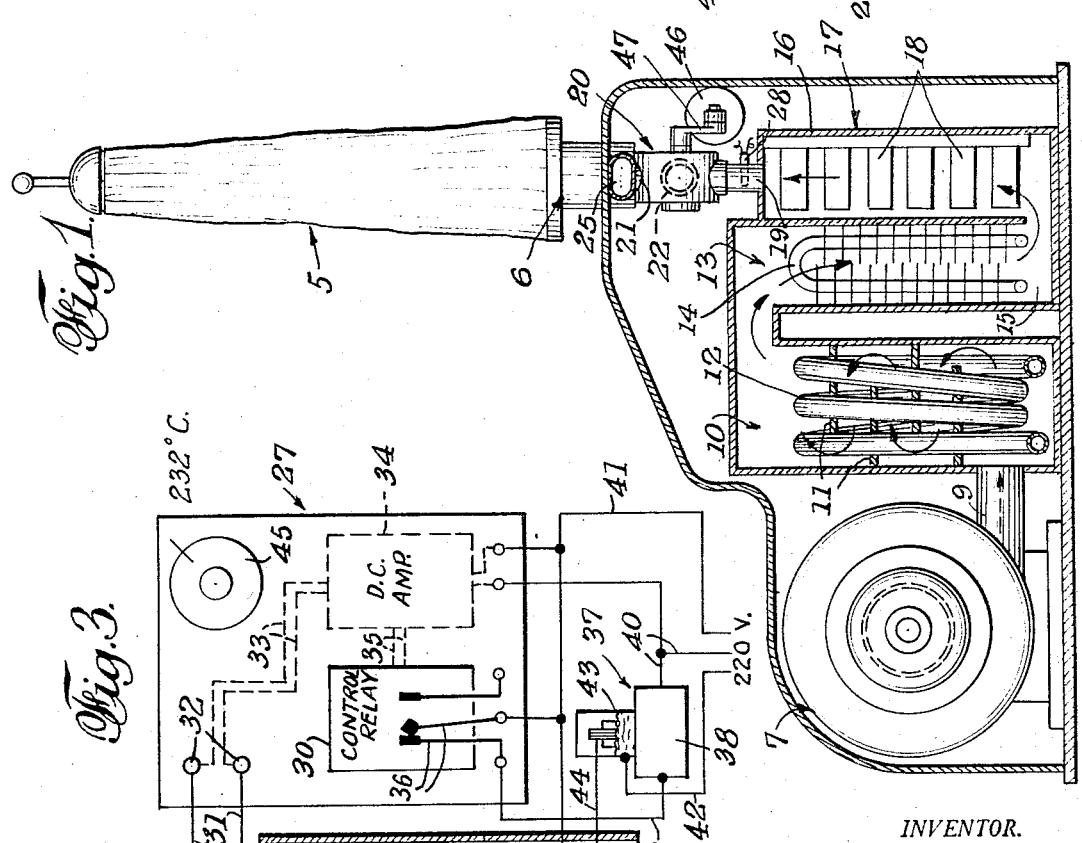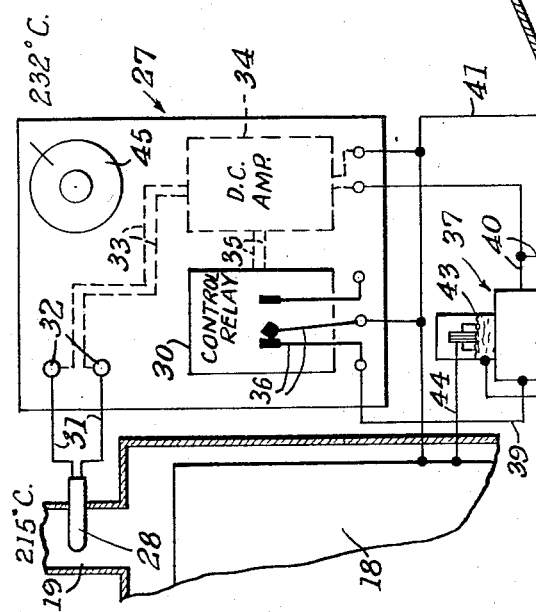

3,297,216
APPARATUS AND METHOD FOR HIGH
TEMPERATURE CURING OF FABRICS
David L. Radford, Salt Lake City, Utah, assignor to McGraw-Edison Company, Elgin, Ill., a corporation of Delaware
Filed Oct. 5, 1965, Ser. No. 493,173
10 Claims. (Cl. 223—73)

This invention relates to apparatus and a method for curing impregnated fabrics at high temperatures, the invention being primarily concerned with curing the resins that impregnate woven fabrics such as are used as shirting and for various garments, as pants, skirts, jackets, jeans, levis, slacks and the like, the main object of the invention being to treat such fabrics by application only of heat while retaining the same in a smooth and/or distended condition, thereby causing the resins to cure and impart to the fabrics wrinkle resistance of a high order.

Another object of the invention is to treat resin-impregnated fabrics that have been permanently creased during curing of said resins and removing wrinkles therefrom while retaining such creases.

Permanent ceasing of such fabrics is advantageously carried out in pressing machines that press the same under controlled pressures and temperatures. Use of such presses falls short of treating certain garments or portions thereof under desired production maintenance, due to the material becoming embossed by seams and fillers which leave permanent, undesirable marks.

A further object of the invention is to treat garments made of resin-impregnated fabrics that have been permanently creased and are provided with accessory filler items, such as pockets, and other members, as buttons and fasteners, to remove wrinkles therefrom without undesirably embossing or marking the garment by said filler items and other members.

The particular impregnants used in the fabrics above discussed do not comprise part of this invention. Shirting material impregnated with a urea formaldehyde base resin is exemplary of materials that may be handled by the present apparatus and method. Such a resin may be semi-cured in the fabric, and is fully cured as a grament, in a press that imparts creases and/or in the apparatus of the present invention where wrinkle-removing is effected while fully curing the impregnant.

A still further object of the invention is to provide apparatus for carrying out the above discussed treating method.

This invention also has for its objects to provide a novel, economical and convenient method or process of superior utility, and to provide apparatus that is positive in operation, convenient in use, easily installed in working position and easily disconnected therefrom, economical of manufacture, relatively simple, and of general superiority and serviceability.

The above objects are realized in an apparatus and method in which a garment made of resin-impregnated fabric or portions thereof, as sleeves or legs, are mounted on air bags of high-temperature woven fabric, an example of which is Nomex I, through the interstices of which heated air is forced, said air thus being forced through the garment portions on the bags. Depending on the weight of the fabric, a blower drawing ambient air, directs its compressed outlet air to a pre-heater tank which raises the air temperature in a range of 133° to 150° C. This pre-heater is preferably in the form of a heat exchanger employing steam to heat the air flow confined in fin-provided pipes. The pre-heated air is then directed to an electric pre-heat exchanger that raises the air temperature in a range of 193° to 205° C. This air from the electric pre-heat exchanger is now directed to an electric heat controller which is controlled by pre-settable electric control means that electrically interconnects the heat controller with a sensor that is in the path of flow of the heated-air output of the controller to the mentioned air bag. The control means is settable to raise this output in a range of 205° to 288° C. and the sensor controls a switch in the circuit to cause controlled operation according to the demands of the sensor.

When the power to the blower is on and the steam is being fed to the pre-heater tank, and the air is being raised in stages from ambient to a maximum of 288° C. and the bags are undressed, the air flow is diverted to a by-pass which may be recycled to the system, or shut off completely by de-energizing the electrical system to the pre-heater and pre-heat exchanger. Upon the bags being dressed, the heated air flow is opened to the bags and, therefore, through said bags and the garment portion dressed thereon.

For lighter weight fabrics the air flow may be continued from ten to fifteen seconds and for heavier fabrics, such as denims, twenty to thirty seconds may be required for complete curing of the resin impregnant.

The invention also contemplates novel combinations of methods steps as well as novel details of construction and novel combinations and arrangements of parts, which will appear more fully in the course of the following description, which is based on the accompanying drawing. However, said drawing merely shows and the following description merely describes, the invention with respect to a preferred method and apparatus, the same, nevertheless, being given by way of illustration or example only.

In the drawing, like reference characters designate similar parts in the several views.

FIG. 1 is a semi-diagrammatic vertical sectional view of apparatus for hight temperature curing of fabrics.

FIG. 2 is a vertical sectional view taken on one plane through the bags of the apparatus.

FIG. 3 is a diagrammatic control means for the final air heating stage of the apparatus.

The present appartus comprises, generally, one or more air pervious bags 5 mounted on perforated conduits 6 that supply heated air to the interiors of said bags; a source of compressed air comprising an air blower 7 with an inlet 8 through which ambient air is drawn into the blower for compression thereof and discharge from an outlet 9; a pre-heater tank 10 receptive of the outlet flow of the outlet 9 and circulated by baffle walls 11 in said tank while effecting a heat exchange with a steam coil 12 to a pre-heated temperature range of 133° to 150° C.; and an electric pre-heat exchanger 13 receptive of the air heated by the steam coil 12 under the pressure of the blower 7, said exchanger 13 comprising finned electric heaters 14 that raise the air temperature in a range of 193° to 205° C. and are disposed in a tank 15 that is open at the top to the tank 10 and has an air outlet to the housing 16 of an electric heat-controlled heater 17 in which a group of electric heaters 18 is housed. The same raises the air temperature in the housing 16 in a range between 205° to 288° C., the air thus heated exiting through a pipe 19; a flow-controlling valve 20 that receives heated air from said pipe 19, has two outlets 21 and 22, and a rotatable gate 23 on a shaft 24, said gate, according to its rotated position controlling air flow to either outlet 21 or 22; a fitting 25 receiving air flow from outlet 21 and directing the same to the perforated conduits 6, whether the same are vertical, as shown, or in any other disposition; a by-pass line 26 receiving air flow from outlet 22 and either discharging to atmosphere or being connected to re-circulate the air therein to the pump 7 or to one of the air-heating units 10 or 13; and a control device 27 (FIG. 3) to control the operation of the heater 17 under sensing control of a sensor 28 in the flow to the valve 20.

The heat exchangers 10 and 13, at whatever temperatures within the ranges thereof, supply a steady or controlled flow of heated air. The same do not require changes in their setting except, perhaps, when there is a material change in the type of impregnated material that is draped in the form of a garment or portions thereof, or the weight of such material. For the purposes of this invention, the heated air entering the heater 17 may be considered as constant in the approximate range of 193° to 205° C. The impregnated fabrics contemplated to be cured by the present method and means cannot exceed 288° C. which is a critical maximum respecting scalding of the bags 5, if made of Nomex I, as hereinbefore mentioned. However, in contemplation that bags 5 of higher heat resistance to swelling and impregnants that may require higher curing temperatures as, for instance, those used in presses that permanently crease resin-impregnated fabrics, the control means may be designed to achieve the mentioned exemplary maximum 288° C. in the air flowing past the sensor 28. The present disclosure will be based on a pre-set temperature of 232° C. as the output of the heater 17, with the sensor 28 activating the control device 27 upon a temperature drop at said sensor of twenty degrees to 215° C. The following will make it clear that higher or lower pre-set temperatures and temperature drops in relation thereto, may be used.

The device 27, shown in FIG. 3, is a modification of a Versa-Tran Amplifier Relay, R7079A, a product of Minneapolis-Honeywell Regulator Company of Minneapolis, Minn., and which comprises an amplifier relay for use as a temperature controller. The Versa-Tran controller is a D.C. amplifier type controller relying on a varying resistance to trigger the control relay 30 thereof. In the present case, the resistance is inverse in the operation, i.e., the relay 30 triggers upon a lowering in resistance of the sensor 28 which is a thermistor type of device that has a normally high resistance and in which the resistance lowers as the temperature of the air flowing therepast increases.

With the temperature in conduit 19 low, i.e., at about 215° C., the resistance of the sensor 28 is high. This is a heat *call for* situation. The sensor 28, by way of conductors 31, terminals 32, conductors 33, D.C. amplifier 34, and conductors 35, energizes the relay 30 and causes contacts 36 thereof to close.

These switch contacts 36, closing as they do, on a temperature drop situation, will not again open until the resistance in the sensor 28 is lowered which can only be caused by an increase of the temperature of the air flowing in pipe 19 to the pre-set level of 232° C. Thus, as long as the resistance of the sensor is high in relationship to the resistance thereof when in a 232° C. environment, the device will continue to call for heat from the heater 17. As the heat in pipe 19 increases, the sensor resistance decreases until, at the pre-set temperature in said pipe, the control relay 30 will become de-energized, opening the contacts 36.

A relay 37 has a coil 38 that is in circuit across the contacts 36 by a conductor 39 from one of said contacts, and a conductor 40 to the neutral line of a 230 v., single phase power circuit. This coil 38 is energized when the contacts 36 are closed. Said power circuit includes a conductor 41 that is connected to the one terminal of a bank or series of electric heaters 18, a conductor 42 connected to one side of a mercury switch 43, and a conductor 44 connecting switch 43 to the other terminal of said bank of heaters 18.

It will be clear from the foregoing that the closed contacts 36, by causing energization of the relay coil 38, connect the bank of heaters 18 in a power circuit that comprises the power conductor 41, bank of heaters 18, conductor 44, switch 43 and power conductor 42.

The temperature pre-set dial 45 of the Versa-Tran amplifier is a controller for varying the resistances of a conventional resistor that is the reference leg of a resistance bridge, with the resistor in the thermistor or sensor as the other bridge leg. It will be clear that the bridge will balance when the resistance of the sensor 28 matches that of the reference leg, thereby de-energizing the circuit to the relay 30 and causing the circuit to the heater bank 18 to open. When the temperature in pipe 19 lowers, as a consequence, the sensor resistance again increases to cause switch contacts 36 to open.

When the air in pipe 19 starts cooling and causes increase of the resistance of the sensor to a value equal to or greater than the reference resistance, as set by dial 45, the contacts 36 will again close to connect the heater bank 18 in circuit.

In practice, the above control means cuts off power to the heaters 18 at a pre-set ratio of the reference and sensor resistance values. Actually, the operation anticipates the 232° C. setting by a few degrees and starts cutting back early.

The position of the gate 23 in the valve 20 may be controlled by means such as a cylinder 46 that is air-operated to project and retract a piston that, by a lever 47 rotates the shaft 24 through an arc of 90° to close outlet port 21 or 22, as desired. With said gate 23, as in FIG. 2, closing port 21, the air reaching the valve 20 by-passes through line 26.

With the heated air in pipe 19 at or approaching the preset temperature of 232° C., the bags 5 are dressed with a garment or parts thereof made of a resin-impregnated fabric. The gate 23, by operation of the cylinder 46, is then moved in a direction to open hot air flow to tubes 6 and, therefore, into the interiors of said bags 5, and closing flow into the by-pass line 26. The air flow at this position may be timed automatically or by manual manipulation. Ten to fifteen seconds for lighter fabrics, and twenty to thirty seconds for heavier fabrics, is required for curing of the impregnants.

The permeable bags 5 balloon out under the internal pressure of the heated air. In practice, said bags may be full enough so that, when distended, they exert some pressure on the inside of the garment dressed thereon. Also, the bags 5 may be smaller than the garment and, when distended by the air, have little or no contact with the garment, but serve rather as an aid for diffusing or distributing the air.

It will be realized that a garment or a part thereof, such as a sleeve or leg, may be mounted on the perforated conduits 6. Such a garment or garment part will become distended by the heated air supplied through the perforations of the conduits 6, and curing of the garment will be achieved, even though bags have not been used. The perforations of conduits 6 may be made smaller and more numerous, as would be afforded by a screen mesh or grid, in order to obtain desired dispersion of air inside the garment.

While the sensor 28 is shown in the flow of heated air in pipe 19, it can have an alternative location. Said sensor may be near or on the heater 18 or in the space housing said heater. Thus, all power may be shut off from the chambers 13 and 17 with the group of heaters 18 under standby operation or condition ready for curing. In such an arrangement, if curing at 232° C. is required, the heaters would be actually 255° C. for all practical purposes. If the reference leg of the mentioned resistance bridge is set at 255° C. when the air is shut off, the heater will shut down due to the instant heat build-up in the chamber and on the heater. However, the heater would not cool down to ambient but would seek a balance of 255° C. on the heater itself in somewhat of a standby condition.

The apparatus may comprise a pre-heater 10, and the exchanger 13 and controlled heater 17 may be combined as a single heating device responsive to the sensor 28.

While the foregoing illustrates and describes what is now contemplated to be the best mode of carrying out the invention with respect to both the method and apparatus, the same is, of course, subject to modification without departing from the spirit and scope of the invention. Therefore, it is not desired to restrict the invention to the particular method steps or combination or sequence of steps described, nor to the particular form of construction illustrated and described, but to cover all equivalents or modifications of method and apparatus that may fall within the scope of the appended claims.

Having thus described the invention, what is claimed and desired to be secured by Letters Patent is:

1. Apparatus for high temperature curing of resin-impregnated fabrics comprising:
    (a) at least one air-pervious bag adapted to be dressed with a garment made of such a fabric,
    (b) a source of compressed air,
    (c) first means to heat said air to a generally constant heat level,
    (d) second means to increase the level of heat of air discharged from the first-mentioned means,
    (e) a high-resistance electrical sensor located in the flow of the air discharge of the latter means,
    (f) means responsive to changes in the level of the temperature of the air flowing around the sensor to control the means to increase the level of heat discharged from said first mentioned means, and
    (g) a conduit to conduct the flow of heated air to the interior of the bag for passage under the pressure of said air through the bag and to the interior of the garment dressed thereon.

2. Apparatus according to claim 1 in which
    (a) the high resistance sensor is connected in a bridge circuit,
    (b) with a reference resistance that is adapted to be pre-set to a heat-controlling level, and
    (c) switch means operated by said bridge circuit to vary the level of heat in the second heat means according to the balance or imbalance of the resistance of the sensor with relation to the pre-set reference resistance.

3. Apparatus according to claim 1 provided with
    (a) a valve in the flow of air beyond the sensor and having an outlet to the interior of the bag and an air-bypassing outlet, and
    (b) means to set said valve to selectively open one outlet and close the other.

4. Apparatus for high temperature curing of resin-impregnated fabrics comprising:
    (a) at least one air-pervious bag adapted to be dressed with a garment made of such a fabric,
    (b) a source of compressed air,
    (c) first means to heat said air to a generally constant heat level,
    (d) second means receiving the air flow from the first means to further heat said air to a higher level,
    (e) a control device having a relay switch-controlled electric circuit connected to said second heating means,
    (f) a temperature-variable high-resistance electrical sensor located in the flow of the air from the second heating means,
    (g) the mentioned switch-controlled circuit being energized under control of the sensor resistance to close said circuit under high resistance conditions of the sensor and to open said circuit under lower resistance conditions, and
    (h) a pre-settable reference resistance in electric bridge circuit with the sensor resistance to open and close the switch-controlled circuit according to the state of resistance balance between the sensor resistance and the reference resistance.

5. A method for curing resin-impregnated fabric that consists in
    (a) dressing a garment made of such a fabric on at least one air pervious bag,
    (b) directing a flow of compressed air into the interior of the bag for passage outwardly therefrom to the interior of the garment dressed thereon,
    (c) pre-heating said air flow to an approximate level of 205° C.,
    (d) increasing the heat level of said air flow to 288° C., approximately,
    (e) sensing the temperature of the air flow before the same reaches the bag, and
    (f) controlling the increase according to the level of the temperature of the sensed air flow.

6. A method according to claim 5 in which the flow toward the bag is bypassed away from the bag until the same is dressed.

7. A method according to claim 5 in which the pre-heating is carried out in successive stages to bring the air temperature, first, from ambient to an approximate maximum of 150° C., and then, to the mentioned pre-heating approximate level of 205° C.

8. A method according to claim 5 in which the bag is distended by the heated air to its maximum size under internal pressure of the heated air.

9. A method for curing resin-impregnated fabric that consists in
    (a) directing a flow of compressed air into the interior of a garment made of such a fabric,
    (b) pre-heating said air flow to an approximate level of 205° C.,
    (c) increasing the heat level of said air flow to 288° C., approximately,
    (d) sensing the temperature of the air flow before the same reaches the bag, and
    (e) controlling the increase according to the level of the temperature of the sensed air flow.

10. A method for curing resin-impregnated fabric that consists in
    (a) directing a flow of compressed air through a member having perforations through which said air is dispersed into the space around the member and into the interior of a garment made of such a fabric and positioned in loosely spaced relation to the member,
    (b) pre-heating said air flow to an approximate level of 205° C.,
    (c) increasing the heat level of said air flow to 288° C., approximately,
    (d) sensing the temperature of the air flow before the same reaches the bag, and
    (e) controlling the increase according to the level of the temperature of the sensed air flow.

References Cited by the Examiner

UNITED STATES PATENTS 2,931,546  4/1960  Brunier _____ 223—73
2,986,312  5/1961  Petzold et al. _____ 223—73

JORDAN FRANKLIN, *Primary Examiner.*

G. V. LARKIN, *Assistant Examiner.*